Feb. 4, 1941.                C. A. OLSON                2,230,600
                         LUBRICATED GATE VALVE
                         Filed June 9, 1938            3 Sheets-Sheet 3
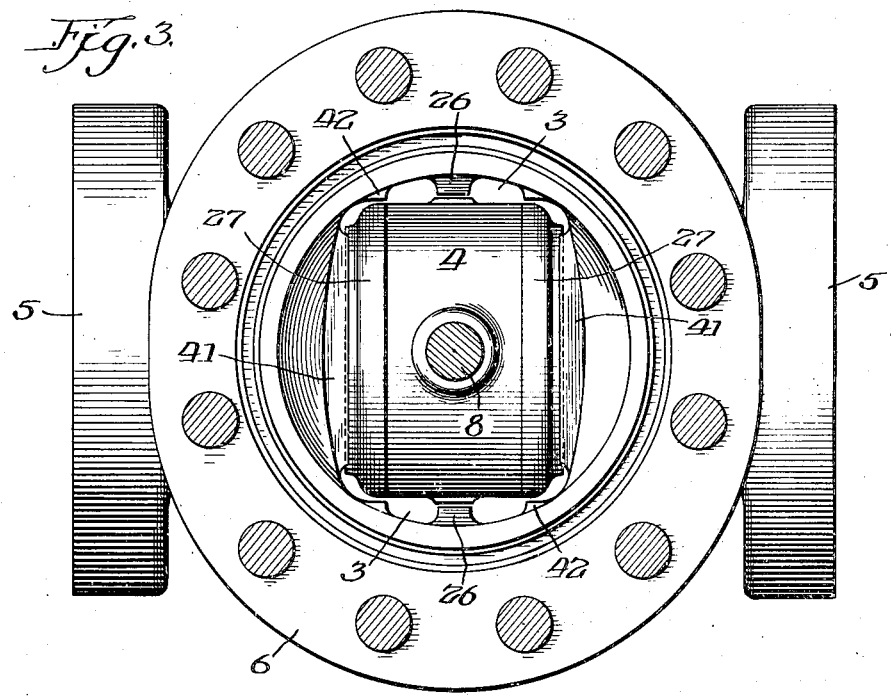
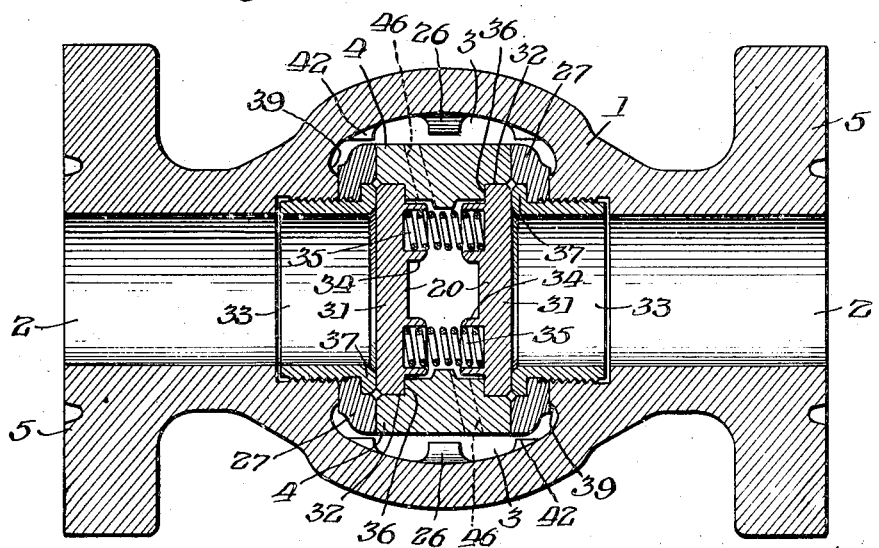

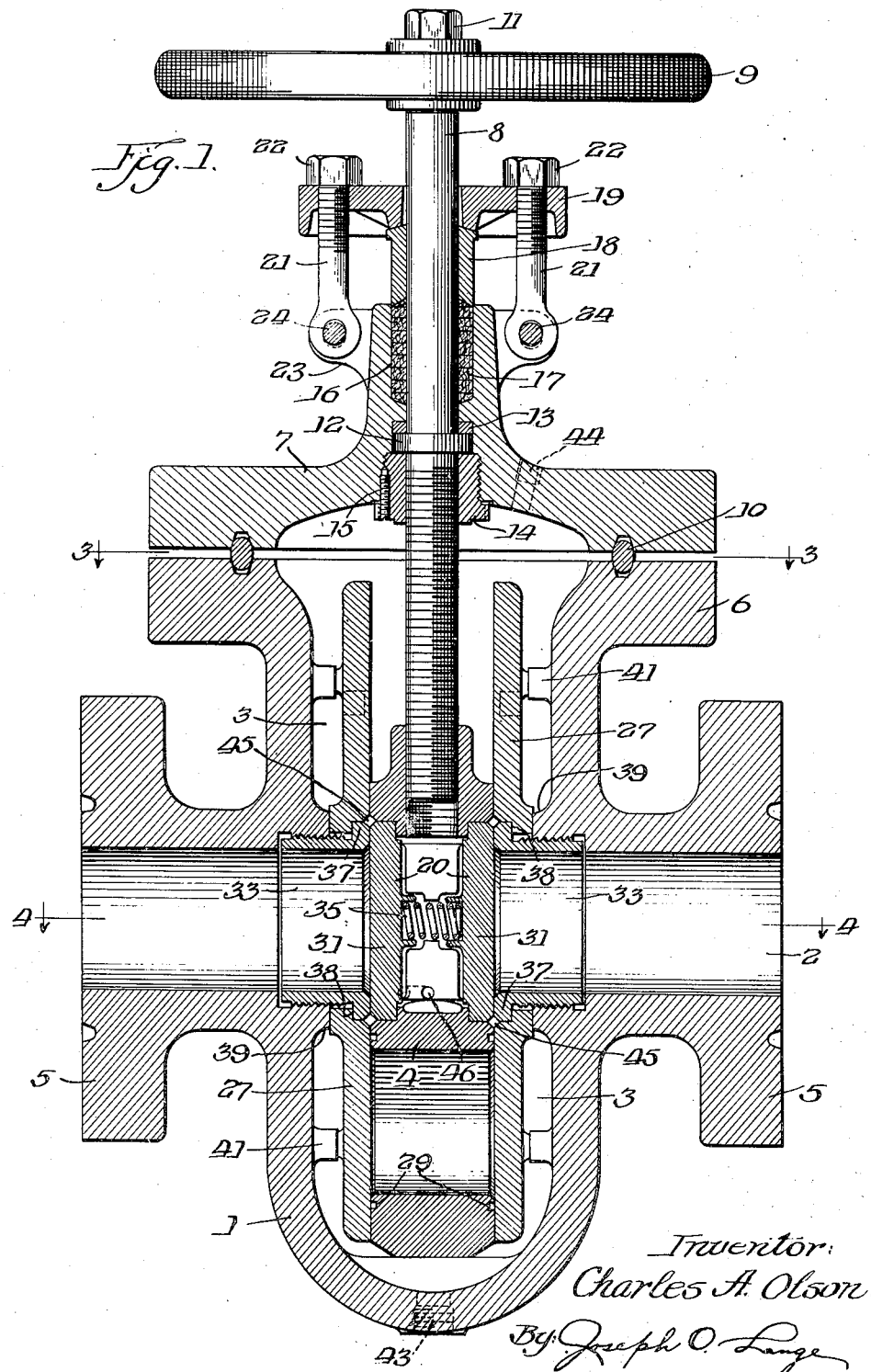

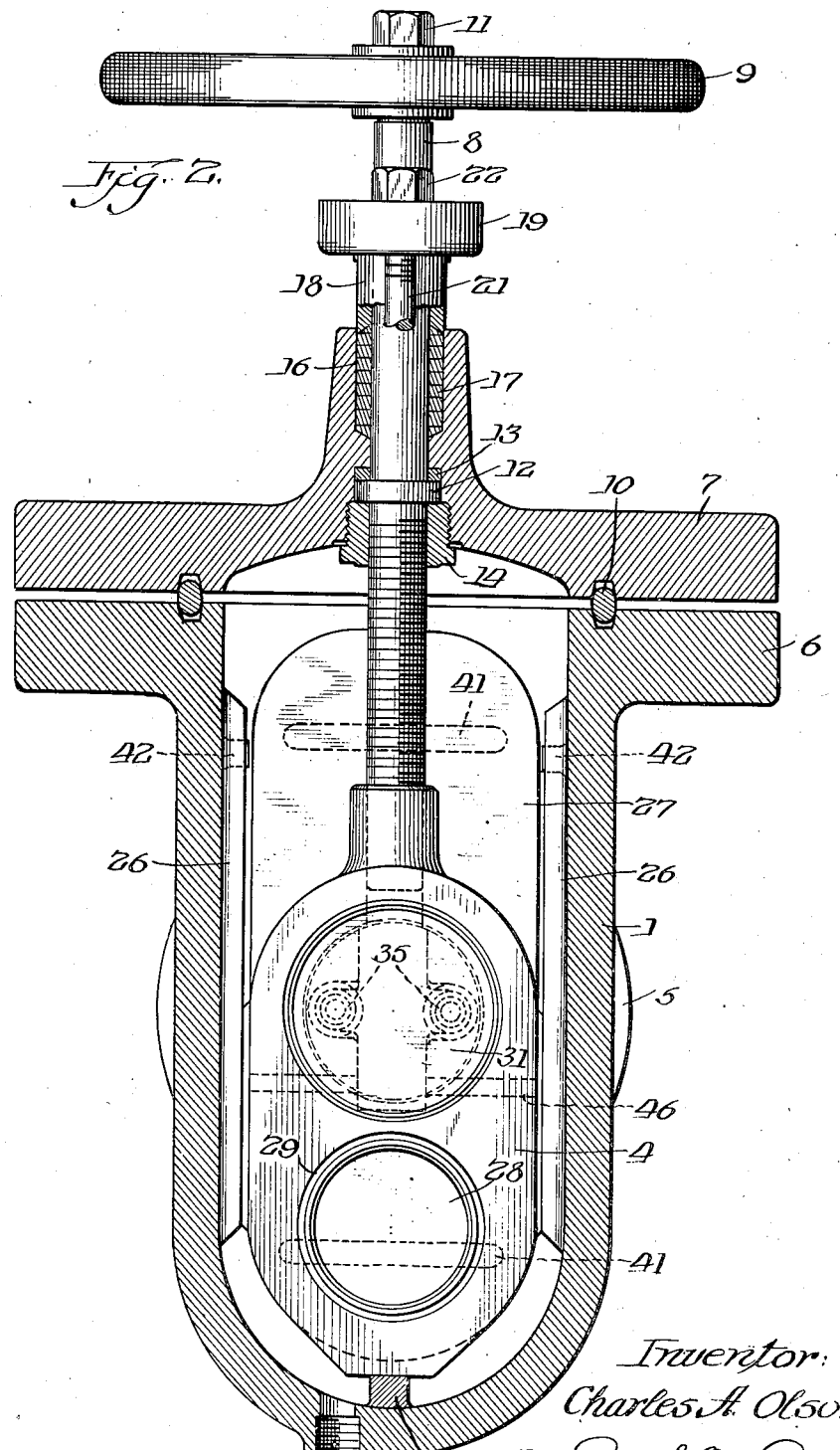

Patented Feb. 4, 1941

2,230,600

UNITED STATES PATENT OFFICE 2,230,600

LUBRICATED GATE VALVE

Charles A. Olson, Geneva, Ill., assignor to Crane Co., Chicago, Ill., a corporation of Illinois Application June 9, 1938, Serial No. 212,708

2 Claims. (Cl. 251—59)

My invention relates to a type of valve, known to those skilled in the art as a conduit type valve, in which the closure member in the open position does not expose the valve seating surfaces to contact with the fluid controlled by the valve, and in which the closure member is encased in a chamber completely filled with a lubricant.

An important object of my invention is to provide a valve in which the movement of the closure member sloshes the lubricant from the lower portion to the upper portion of the chamber enclosed in the valve, and conversely, from the upper portion to the lower portion of the said chamber depending upon, and opposite to, the direction of the movement of the closure member thereby supplying fresh lubricant to the moving parts and contact surfaces which are otherwise subject to considerable wear during normal operation.

Another object of my invention lies in the provision for easily installed guides and seats for the closure member, the said guides restricting the closure member movement the entire length of its travel from the full open position to the shut-off or closed position.

Another important object of my invention is to provide in the closure member certain spring loaded closure parts which bear respectively against the up-stream (inlet) side and the down-stream (outlet) side valve seats.

Another object of my invention lies in the provision for lubricating and sealing grooves in the closure member on the surfaces which are in sliding contact with cooperating surfaces of the previously mentioned guides.

Another object is to provide a valve of the gate type which is easily operable in all positions between the full open and the shut-off, and said valve when full open presents a substantially smooth and unbroken passageway for the fluid controlled by the said valve.

Other objects and advantages will become apparent hereinafter as the description proceeds in connection with the drawings.

Referring to the drawings:

Fig. 1 is a sectional side view disclosing a preferred embodiment of my invention.

Fig. 2 is a sectional end view which shows the external shape of the closure member.

Fig. 3 is a partly sectional plan view taken on the line 3—3 of Fig. 1.

Fig. 4 is a sectional plan view taken on the line 4—4 of Fig. 1.

Similar reference characters refer to similar parts throughout the various views.

Referring to Fig. 1, I form a valve body or casing 1 having a fluid passageway 2 therethrough and a central chamber 3 encasing the closure member 4. At each end of the passageway 2, connecting flanges 5 are provided through which conventional bolts (not shown) may be extended to secure the valve to the usual cooperating flanges on a pipe section. However, other known methods of attaching the valve in a pipe section may be used without departing from or affecting the spirit of my invention. Also on the casing 1 at the upper end of the chamber 3, a flange member 6 is provided to which may be attached a bonnet or cover 7 by means of bolts (not shown) extending therethrough and compressing a toroidally-shaped gasket 10 retained by co-aligning annular grooves in the adjacent faces of the flange 6 and the bonnet 7. Through the bonnet 7 I assemble the journaling valve stem 8, the upper and exposed end of which has attached thereto the handwheel 9 by means of the nut 11, the other end of the stem 8 being screw threadedly attached to the closure member 4.

The valve herein shown is of the non-rising stem type, in which by the rotation of the handwheel 9 the stem 8 revolves in the bonnet 7, the said stem being restricted in axial movement by the integral collar 12 which is retained within the bonnet recess 13 by the stem bushing 14 being screw threaded into the said bonnet recess and being keyed by the screw 15 to prevent accidental removal. In order to prevent line leakage past the stem bearing, a stuffing box 16 is formed within the upper portion of the bonnet 7, the said stuffing box being filled with a compressible packing 17 retained within the said stuffing box by the gland 18 upon which bears the flange 19 secured to the bonnet 7 by the bolts and nuts 21 and 22 respectively, pivotally attached to the bonnet lugs or bifurcated ears 23 by means of pins 24 passed therethrough. The foregoing description is a general one applicable to a conduit type of gate valve.

Attention is now directed to Fig. 2 in which the closure member 4 is shown, as previously mentioned, screw threadedly attached to the stem 8 which is screw threaded substantially the entire length of that portion which extends below the collar 12, thus upon rotative movement of the handwheel 9 and subsequently rotating the stem 8, the closure member 4 is caused to travel axially upon the said stem between the limits bounded by the bushing 14 and the preferably integral body stop 25, the valve body ribs 26 and the guides 27, as more clearly shown in Fig. 3, effectively preventing any substantial movement of the closure member transverse to the axis of the stem 8. The closure member 4 contains in its lower portion the aperture or passageway 28 to which in adjacent disposition are the annularly positioned lubricant sealing grooves 29. The upper portion of the said closure member contains the oppositely disposed discs 31.

Referring now to Fig. 4, the discs 31 are retained within the recesses 32, which extend through the closure member 4, by contact on the outwardly facing surfaces of the discs 31 with the inwardly facing surfaces of the valve seats 33 and the guides 27. The inwardly facing surfaces 20 of the discs 31 are provided with diametrically opposed bosses 34 recessed with pockets to receive the ends of the coil springs 35 thereby providing spaces between the said springs and the said discs to allow for the passage of the stem 8 when the closure member 4 is being raised to place the valve in the open position. The springs 35 are compressed sufficiently between the discs 31 to retain the said discs normally against their respective seats or contact surfaces. However, when the valve is in the closed position and is under a relatively high pressure, it is not expected that the said springs will maintain the up-stream disc 31 against its seat but the said disc will be forced back against the shoulder 36 in the cavity 32 of the closure member 4 whereby a force is exerted through the said closure member to a similar shoulder 36 bearing against the down-stream disc 31. The discs 31 thereby cooperate to form a fluid tight valve, and it will, of course, be obvious that if the direction of flow should be reversed, then the position of the down-stream disc will be correspondingly changed.

Referring back now to Fig. 1, the tubular valve seats or seat bushings 33 are preferably screw threaded into the passageway 2 in coaxial alignment therewith and pass through respective recessed apertures in the guides 27. On the innermost ends of each of the seats 33 are flanges 37 shouldering against the bottoms of the recesses 38 in the respective apertures in the guides 27. Thus upon screwing down each seat 33 firmly, each guide 27 will be secured into place in the chamber 3 between the seat bushing shoulder 37 and the boss 39 on the valve body 1 in the said chamber. The end portions of the guides 27 are braced against flexing by the integral bars 41 in the said chamber and are braced against turning about the axis of the apertures by the lugs 42, the latter being more clearly shown in Figs. 3 and 4.

At the lower end of the valve casing 1, referring to Fig. 2, is a screw threaded opening 43 through which a suitable lubricant may be introduced into the chamber 3 until the latter is completely filled with the lubricant which then exudes through another screw threaded opening 44 (shown in dash lines in Fig. 1) in the bonnet 7. Each of the openings 43 and 44 may then be closed with suitable plugs (not shown).

Again referring to Fig. 1, the corners formed on the peripheries of the discs 31, the seat bushing flanges 37, the closure member cavities 32 and on each guide 27 respectively, are chamfered to form the annular lubricant grooves 45 in which the lubricant collects by seepage between the abutting surfaces of the closure member 4 and the guides 27. Upon movement of the said closure member from the closed position to the open position, or conversely, from the open position to the closed position, the lubricant contained in the grooves 45 and 29 will be spread upon the otherwise dry contacting surfaces of the closure member and the guides. The holes 46 in the closure member are provided to assist further in supplying lubricant to the moving parts of the valve and particularly to that portion of the stem 8 which is inside the closure member.

I have described by these specifications and drawings a construction which is not intended to be limiting but is merely to be illustrative of an embodiment of my invention, the scope of which is defined in the following claims.

I claim:

1. In a valve, comprising a casing having substantially axially aligned fluid passageways, a valve chamber interposed between the said passageways, a closure member reciprocably movable in the said valve chamber, the said closure member having a passageway in its lower portion, means for moving the said closure member passageway between positions in and out of registration with the said casing passageways, the said closure member having in its upper portion associated closure parts, seating members therefor, guide means within said casing for the said closure member, the corners formed on the peripheries respectively of the said closure member, the said closure parts and the said guide means being chamfered to form annularly extending lubricant grooves whereby lubrication is provided between the abutting surfaces of the said closure member and the said guiding means.

2. In a valve, comprising a casing having substantially axially aligned fluid passageways, a valve chamber interposed between the said passageways, a closure member reciprocably movable in the said valve chamber, the said closure member having a passageway in its lower portion, means for moving the said closure member passageway between positions in and out of registration with the said casing passageways, the said closure member having in its upper portion associated closure parts, seating members therefor, guide means within said casing for the said closure member swivelably adjustable relative to the said seating members, the adjacent corners formed on the peripheries respectively of the said seating members and the said guide means being relieved to provide means therebetween whereby lubrication is distributable between the abutting surfaces of the said closure member and the said guiding means.

CHARLES A. OLSON.